Feb. 26, 1924.                1,485,090
T. A. PASSIC
NUT LOCK
Filed Feb. 15, 1923
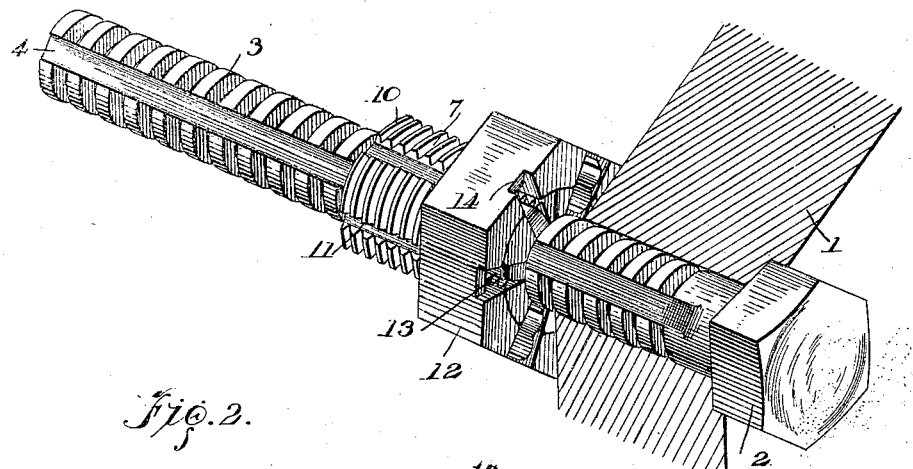
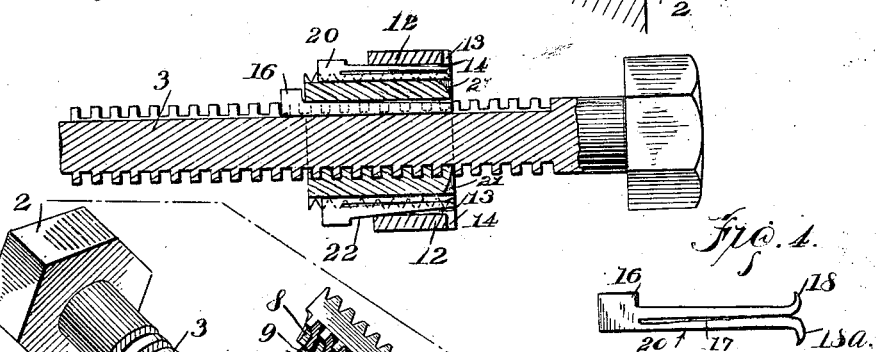
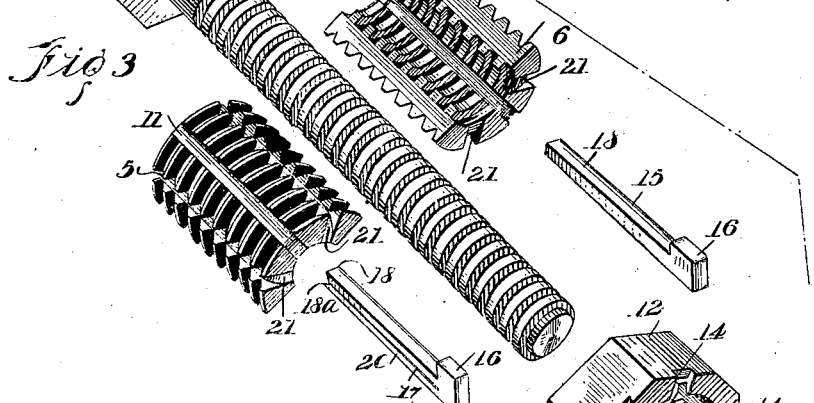
WITNESSES
INVENTOR
Toney A. Passic.
BY
ATTORNEYS Patented Feb. 26, 1924.

1,485,090

UNITED STATES PATENT OFFICE.

TONEY ANTON PASSIC, OF ASHLAND, WISCONSIN.

NUT LOCK.

Application filed February 15, 1923. Serial No. 619,234.

*To all whom it may concern:*

Be it known that I, TONEY ANTON PASSIC, a citizen of the United States, and a resident of Ashland, in the county of Ashland and State of Wisconsin, have invented certain new and useful Improvements in Nut Locks, of which the following is a specification.

This invention relates to nut locks and has for its object the provision of an inner split nut and an outer nut screwed onto the split nut with one or more split keys engaging cooperating grooves in the split nut and the outer nut, the inner ends of the split keys being adapted to be swaged against the work clamped between the nuts and the bolt head for preventing slippage of the pins in their respective slots, a solid key being employed temporarily for holding the split nut rigidly against the bolt when the outer nut is screwed up tight.

Other objects and advantages will become apparent during the course of the following description.

The invention is illustrated by way of example in the accompanying drawings, in which, Figure 1 is a view in perspective of the nut lock engaging the bolt for locking said bolt against a piece of work.

Figure 2 is a longitudinal section of the same.

Figure 3 is a view in perspective of the nut lock and bolt showing the parts disassembled.

Figure 4 is a side view of a split pin showing the manner of bending its ends when the same has locked a nut in position.

Referring to the drawings, 1 designates a piece of work adapted to be engaged at one face by the head 2 of a threaded bolt 3. Said bolt is provided with a longitudinal groove 4 extending from its lower end to a point adjacent the head 2.

Mounted on the threaded bolt 3 are two sections 5 and 6 of a split nut 7. The nut is provided with internal threads 8 adapted to engage the threads of the bolt 3. A section 6 of the split nut 7 is provided with a longitudinal groove 9 cut through the internal threads and adapted to aline with the groove 4 of the bolt 3.

The split nut is provided with external threads 10. Longitudinal grooves 11 are cut through the external threads 10 and extend longitudinally of the nut and in parallel relation with each other and terminate in notches 21.

An external nut 12 is adapted to be screwed upon the external threads 10 of the split nut 7 and is provided with a plurality of longitudinal grooves 13 cut through the internal threads of said nut. These grooves are adapted to aline with the grooves 11 of the split nut 7.

The inner face of the nut 12 is provided with notches 14 in which the longitudinal grooves 13 terminate. The inner face of the split nut 7 and the inner face of the nut 12 are adapted to engage the face of the piece of work 1 which is opposite to the face engaged by the head 2 of the bolt 3.

A wedge-shaped key 15 having a head 16 is adapted to be driven into the alined slot 4 of the bolt 3 and the slot 9 of the section 6 of the split nut 7. The key 15 is designed for temporarily binding the split nut rigidly on the bolt when the outer nut is being screwed up tight on the split nut. When the external nut 12 has been locked in place on the split nut 7 and in rigid engagement with the piece of work 1, the key 15 may be removed since it is no longer necessary. Keys 20 are split at 17 with the ends of the legs of the keys being bevelled as shown at 18 and 18ª.

When the inner face of the nut 12 is drawn up tight against the inner face of the piece of work 1, keys 20 are driven into the alined slots 11 of the split nut 7 and the slots 13 of the nut 12. The inner bevelled ends 18 and 18ª of the legs of the keys 20 are forced against the bottom face of the piece of work 1 and bent in opposite directions and forced into the notches 13 of the nut 12 and the notches 21 in the sections of the split nut 7.

It will be seen that the split keys having their end swaged over and forced into the respective notches adjacent their ends will resist release of the key and likewise turning of the nuts.

The ends of the keys 20 are made of soft metal to permit the ends to be readily forced into the respective notches when a sufficient force has been applied to the heads 16 (as shown more particularly in Figure 4). The heads 16 are hardened to prevent distortion when the keys are driven into their locking position or when it is desired to remove the keys.

As shown more particularly in Figure 2, the cooperating grooves in the nuts 7 and 12 have parallel faces. The outer edges of these grooves are adapted to engage the inclined outer edges 22 of the wedge-shaped keys 20 whereby the legs of the keys are forced together and the keys are wedged into the slots and gripped by either the nut 12 or the nut 7 as the case may be. When the keys are driven sufficiently inward of the slots and the flaring edges 18 and 18$^a$ are forced into engagement with the inner face of the work piece 1, the outer leg will be forced outwardly with the end 18$^a$ being forced into the notches 21.

While I have shown two keys in position between pairs of the cooperating slots 11 and 13, six may be employed, but for most practical purposes one split key is all that is required.

What I claim is:

1. In a nut lock, the combination of a threaded bolt provided with a longitudinal groove, an internally and externally threaded split nut engaging the threads on the bolt and provided with radially disposed notches on the inner end of the nut and a longitudinal groove cut through the internal threads of said nut and adapted to aline with the groove in the bolt, said split nut having longitudinal grooves cut through its external threads and terminating in the notches, an outer nut having notches in its inner end in radial alinement with the notches in the split nut and longitudinal grooves cut through the inner threads and terminating in the notches, said grooves in the outer nut adapted to aline with the external grooves of the split nut, split keys having the ends of their legs bevelled and adapted to be driven into the alined grooves in the split nut and outer nut with the bevelled ends of the legs being swaged into the radial notches in both the split and outer nuts, and a key adapted to be driven into the alined grooves in the split nut and the bolt for temporarily locking the split nut to the bolt.

2. In a nut lock, the combination of a threaded bolt, a split nut having internal and external threads with the internal threads adapted to engage the threads of the bolt, said nut having radially disposed notches in its end and longitudinal grooves cut through its internal threads, an outer nut screwed on the split nut and provided with longitudinal grooves and adapted to aline with the grooves in the split nut, said outer nut being provided with radially disposed notches, and a split wedge-shaped key adapted to be driven into a pair of the alined grooves with the ends of the legs of the key forced into the notches in the nuts and means for temporarily holding the split nut against movement on the bolt.

3. In a nut lock, the combination of a threaded bolt provided with a longitudinal groove, a double-threaded and longitudinally slotted split nut on the bolt, a nut adapted to engage the threads of the split nut, having radially disposed notches in its end and longitudinal grooves cut through its internal threads and adapted to aline with the grooves in the split nut and split wedge-shaped keys adapted to be driven into the alined grooves and the ends of its legs forced into the notches in the nuts, said key having a hard metallic head, the ends of the legs of the split key being of soft metal whereby the same may be readily forced into the notches.

TONEY ANTON PASSIC.